United States Patent
Dhaka

(10) Patent No.: US 12,317,376 B2
(45) Date of Patent: May 27, 2025

(54) SYSTEM AND METHOD FOR AUTO-CREATION AND ASSIGNMENT OF TAC/TAL GEOGRAPHY

(71) Applicant: RAKUTEN SYMPHONY, INC., Tokyo (JP)

(72) Inventor: Prithvi Raj Dhaka, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/905,180

(22) PCT Filed: Jul. 6, 2022

(86) PCT No.: PCT/US2022/036171
§ 371 (c)(1),
(2) Date: Aug. 29, 2022

(87) PCT Pub. No.: WO2024/010573
PCT Pub. Date: Jan. 11, 2024

(65) Prior Publication Data
US 2024/0196200 A1    Jun. 13, 2024

(51) Int. Cl.
*H04W 8/26* (2009.01)
*G06F 3/04812* (2022.01)
*G06F 3/0487* (2013.01)
*H04W 64/00* (2009.01)

(52) U.S. Cl.
CPC .......... *H04W 8/26* (2013.01); *G06F 3/04812* (2013.01); *G06F 3/0487* (2013.01); *H04W 64/006* (2013.01)

(58) Field of Classification Search
CPC ..... H04W 8/26; H04W 64/006; H04W 24/02; G06F 3/04812; G06F 3/0487
USPC ...................................................... 455/432.1
See application file for complete search history.

(56) References Cited

U.S. PATENT DOCUMENTS

| | | | |
|---|---|---|---|
| 10,212,693 B2* | 2/2019 | Agarwal ............... | H04W 64/00 |
| 2019/0141659 A1* | 5/2019 | Frenger ................ | H04W 60/04 |
| 2024/0056830 A1* | 2/2024 | Bhatnagar ............ | H04W 60/00 |

* cited by examiner

*Primary Examiner* — Huy C Ho
(74) *Attorney, Agent, or Firm* — HAUPTMAN HAM, LLP

(57) ABSTRACT

A method of auditing tracking area code (TAC) assignments includes obtaining one or more tracking area code (TAC) assignments for one or more new evolved Node B (eNB) sites added to a RAN network in a geographic area; verifying a TAC threshold, where the TAC threshold corresponds with a predetermined number of eNBs per TAC; in response a TAC being below the TAC threshold, assigning a TAC ID of a corresponding neighboring TAC to the TAC; and in response to the TAC being above the TAC threshold, splitting the TAC into two or more TACs.

20 Claims, 7 Drawing Sheets

SYSTEM AND METHOD FOR AUTO-CREATION AND ASSIGNMENT OF TAC/TAL GEOGRAPHY

RELATED APPLICATIONS

The present application is a National Phase of International Application No. PCT/US2022/036171, filed Jul. 6, 2022.

TECHNICAL FIELD

This description relates to an auto-creation and assignment of TAC/TAL geography system and method of using the same.

BACKGROUND

A cellular network is a telecommunication system of mobile devices (e.g., mobile phone devices) that communicate by radio waves through a local antenna at a cellular base station (e.g., cell tower). The coverage area in which service is provided is divided into small geographical areas called "cells". Each cell is served by a separate low-power-multi-channel transceiver and antenna at the cell tower. Mobile devices within a cell communicate through that cell's antennas on multiple frequencies and on separate frequency channels assigned by the base station from a common pool of frequencies used by the cellular network.

A Radio Access Network (RAN) is part of the telecommunication system that implements radio access technology. RANs reside between devices such as a mobile phone, a computer, or any remotely controlled machine and provides connection with its Core Network (CN). Depending on the standard, mobile phones and other wireless connected devices are varyingly known as User Equipment (UE), terminal equipment, Mobile Station (MS), and the like.

SUMMARY

In some embodiments, a method of auditing tracking area code (TAC) assignments includes obtaining one or more tracking area code (TAC) assignments for one or more new evolved Node B (eNB) sites added to a RAN network in a geographic area; verifying a TAC threshold, where the TAC threshold corresponds with a predetermined number of eNBs per TAC; in response a TAC being below the TAC threshold, assigning a TAC ID of a corresponding neighboring TAC to the TAC; and in response to the TAC being above the TAC threshold, splitting the TAC into two or more TACs.

In some embodiments, an apparatus for auditing tracking area codes (TACs) includes a processor; and a memory having instructions stored thereon that, when executed by the processor, cause the apparatus to obtain one or more tracking area code (TAC) assignments for one or more new evolved Node B (eNB) sites added to a RAN network in a geographic area; verify a TAC threshold, where the TAC threshold corresponds with a predetermined number of eNBs per TAC; in response a TAC being below the TAC threshold, assign a TAC ID of a corresponding neighboring TAC to the TAC; and in response to the TAC being above the TAC threshold, split the TAC into two or more TACs.

In some embodiments, a non-transitory computer readable medium having instructions stored thereon that, when executed by a processor, cause an apparatus to obtain one or more tracking area code (TAC) assignments for one or more new evolved Node B (eNB) sites added to a RAN network in a geographic area; verify a TAC threshold, where the TAC threshold corresponds with a predetermined number of eNBs per TAC; in response a TAC being below the TAC threshold, assign a TAC ID of a corresponding neighboring TAC to the TAC; and in response to the TAC being above the TAC threshold, split the TAC into two or more TACs.

BRIEF DESCRIPTION OF THE DRAWINGS

Aspects of the present disclosure are best understood from the following detailed description read with the accompanying FIGS. In accordance with the standard practice in the industry, various features are not drawn to scale. The dimensions of the various features are arbitrarily increased or reduced for clarity of discussion.

DETAILED DESCRIPTION

Figure 1:
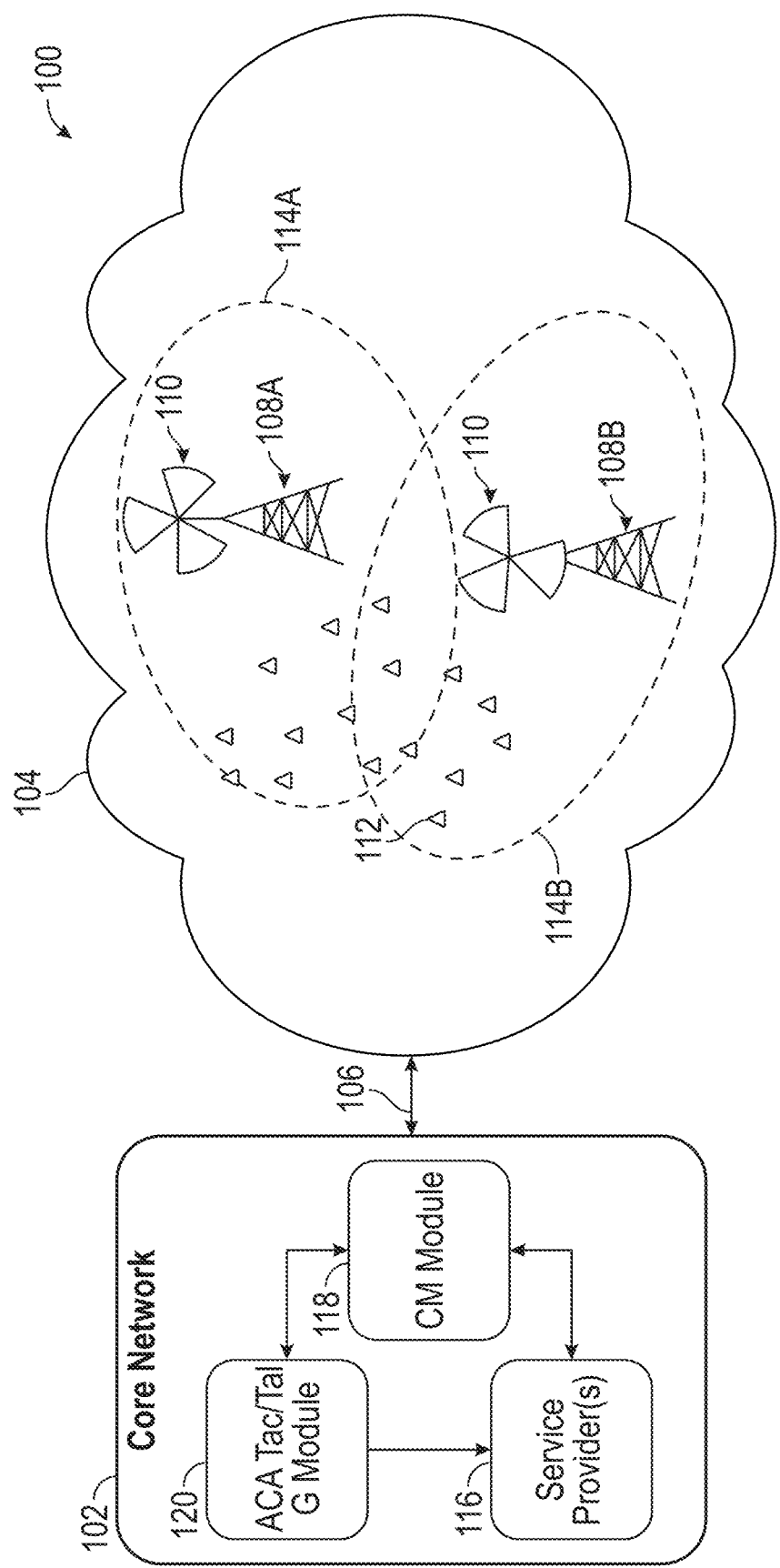
FIG. 1 is a diagrammatic representation of an auto creation and assignment of Tracking Area Codes (TAC) Tracking Area List (TAL) geography (ACA TAC/TAL G) system, in accordance with some embodiments.

The following disclosure provides many different embodiments, or examples, for implementing different features of the provided subject matter. Examples of components, values, operations, materials, arrangements, or the like, are described below to simplify the present disclosure. These are, of course, examples and are unintended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

In some embodiments, a system and method for auto creation and assignment of Tracking Area Codes (TAC)/Tracking Area List (TAL) geography (ACA TAC/TAL G) is discussed. TACs are a group of eNodeBs (eNBs) in one area with maximum number of eNBs (e.g., 200 eNBs). TAC is an identifier of the location area within a mobile network operator's (MNO's) network. This part of the code is represented using hexadecimal values with a length of two octets.

TAL is a group of TACs (a group of eNBs) which are used to page UEs within the network TAL geographical area. TAL is a scheme introduced in 3GPP release 8 (herein incorporated by reference in entirety). With TAL, instead of assigning one TAC to each UE, one UE has a list of TACs (a group of eNBs). The UE receives a TAC list from a cell, and keeps the list, until the UE moves to a cell that is absent from the list. In LTE standards, a cell is also able to give different lists to different UEs. The UE location is known in the mobility management entity (MME) to at least the accuracy of the TAL allocated to that UE.

The MME is the control-node for the LTE access-network. The MME is responsible for idle mode UE paging and tagging procedure including retransmissions. Paging is the mechanism in which a network communicates to a UE (e.g., saying I have something for you). The UE decodes the content (i.e., paging cause) of the paging message and the UE initiates the appropriate procedure. In most cases, this paging process happens while the UE is in idle mode. This means that the UE monitors whether the network is sending any paging messages and this monitoring requires energy (e.g., battery) to run the monitoring process. In response to running the monitoring process continuously, even in the idle mode, consumes energy.

The MME is involved in the bearer activation/deactivation process and is also responsible for choosing the serving gateway (that routes and forwards user data packets, while further acting as the mobility anchor for the user plane during inter-eNB handovers and as the anchor for mobility between LTE and other 3GPP technologies) for a UE at the initial attach and at time of intra-LTE handover involving core network (CN) node relocation. The MME is responsible for authenticating the user (by interacting with the home subscriber server). The Non-Access Stratum (NAS) signaling terminates at the MME and the NAS is also responsible for generation and allocation of temporary identities to UEs. The MME checks the authorization of the UE to camp on the service provider's public land mobile network (PLMN) and enforces UE roaming restrictions. The MME is the termination point in the network for ciphering/integrity protection for NAS signaling and handles the security key management.

E-UTRAN node B, also known as evolved node B (abbreviated as eNodeB or eNB), is the element in evolved universal mobile telecommunications system (UMTS) terrestrial radio access (E-UTRA) of long-term evolution (LTE) that is the evolution of the element node B in UTRA of UMTS. eNB is the hardware that is connected to the mobile phone network that communicates directly with mobile handsets (UEs), like a base transceiver station (BTS) in global system for mobile communications (GSM) networks.

Inaccurate assignment (e.g., manually by network engineers or operators) of TAC/TAL, leads to tracking area updates (TAUs) occurring frequently which increases the load on the MME and UE power consumption. TAUs are performed periodically or when the UE moves to a tracking area that is not included in its TAC list. In response to TAUs occurring frequently, a UE is unable to respond to a paging message during TAU, reducing the paging success rate.

In some embodiments, an ACA TAC/TAL geography system and method includes creation of TAC/TAL boundaries pursuant to the configuration information received from the configuration management module (CM is a module for establishing and maintaining a network's performance and quality) daily. In some embodiments, an ACA TAC/TAL geography system and method includes manual assignment of TACs for recently added sites (e.g., eNBs) to the network. In some embodiments, an ACA TAC/TAL geography system and method includes an audit that shows an anomaly for incorrect assignment of TACs in the network (e.g., a manually assigned TAC is incorrectly assigned). In some embodiments, an ACA TAC/TAL geography system and method allows a user to make corrections for next day improvement based upon detected anomalies. In some embodiments, an ACA TAC/TAL geography system and method improves network performance which results in improved customer experience (CX).

TAC and TAL planning is used to determine the size of a TAC boarder and TAL border. The TAC boarder size is the number of eNBs in the TAC and TAL boarder size is the number of TACs in a TAL. In response to a handful of eNBs being in a TAL, TAUs occur frequently, and MME load and UE power consumption increase. In response to TAUs occurring frequently, a UE is unable respond to a paging message during TAU, reducing the paging success rate. In response to the number of users increasing in a TAL, paging load increases and a further TAL split is used to solve paging overload. In some embodiments, a TAL balances the TAU frequency and paging load which optimizes the number of eNBs in a TAL.

In some embodiments, TAC boundary visualization is provided. Visualizing the TAC boundaries is based on the TAC configured for the eNBs in the element management system (EMS). An EMS manages specific types of one or more network elements within a telecommunication management network (TMN). In most cases the EMS within a network element manages functions and capabilities, but not necessarily traffic. The EMS communicates upward to higher-level systems of network management (NMS), to manage the traffic between the EMS and other network elements. The EMS is a part of the telecommunications management solution. One reason is that the EMS is an exposed network element within the TMN and acts as the mediator of the information. EMS also controls the network elements within a network management system. This visualization is updated on the daily basis. A TAC layer is available in network boundaries and is visible from 500 KM zoom level in a network visualization application.

In some embodiments, a network visualization application is configured to use data analysis for real-time network visualization. In some embodiments, an ACA TAC/TAL G includes a network visualization application.

Telecommunications operators use information about network performance, user experience (UX), and network reachability (e.g., used to understand whether UE is offline or online and using Wi-Fi or mobile data). To improve network performance, reliable and well-organized analytics allow engineers to make decisions based on geographical coverage areas. In some embodiments, a user (e.g., an engineer or network executive) enables an ACA TAC/TAL G module. In some embodiments, the network performance and reachability are monitored through shaped layer presentations (e.g., shaped layers include hexagons, circles, rectangles, or other suitable shapes within embodiments of the present disclosure). In some embodiments, network performance in a cluster or a geographical area is analyzed based on the shaped layer presentation. In some embodiments, data filtration configured to be used for the shaped layer presentation is based on network use. In some embodiments, regular data updating, and visualization is based on crowdsource collected data to determine the current UX. In some embodiments, a user accesses the NV module through the world wide web (WWW) and/or in mobile view (e.g., accessed on a UE).

In some embodiments, TAL boundary visualization is provided. Visualizing the TAL boundaries is based on the TAL configured for the eNBs in the MME. This visualization is updated daily. The TAL layer is available in network boundaries and is visible from 500 KM zoom level in a network visualization application.

In some embodiments, a TAC Audit is provided. In some embodiments, a TAC Audit is accessed in a CM module. The audit identifies the sites in which the actual TAC (e.g., inaccurate TAC assignment either manually or automatically) is not the same as the planned TAC. In some embodiments, a user views the site counts with different (e.g., inaccurate) and planned TAC IDs. The audit further provides the TAC utilization assuming the maximum number of sites in each TAC as 80. In some embodiments, on-air and planned sites are considered for calculation of TAC utilization. The TAC discrepancies are presented for non-radiating sites as well, and these non-radiating sites are decommissioned so as not to appear in the audit.

RF planners ensure there is a polygon (usually represented in a network visualization application) associated with each TAC. In response to multiple polygons for any TAC, the RF planners change or edit the TAC of the sites into smaller polygons.

In some embodiments, TAC and TAL generation is provided. Aspects of the present disclosure help to plan the TAC and TAL for the new sites. A TAC planning feature is available in the CM. The user searches the site to plan the TAC and TAL, select the plan by dragging the plan into the planning window and generating the TAC and TAL for the plan.

FIG. 1 is a diagrammatic representation of an auto creation and assignment of Tracking Area Codes (TAC) Tracking Area List (TAL) geography ACA TAC/TAL G system 100, in accordance with some embodiments.

ACA TAC/TAL G system 100 includes a CN 102 communicatively connected to RAN 104 through backhaul 106, which is communicatively connected to base stations 108A and 108B (hereinafter base station 108), with antennas 110 that are wirelessly connected to UEs 112 located in geographic coverage cells 114A and 114B (hereinafter geographic coverage cells 114). CN 102 includes one or more service provider(s) 116, CM module 118, and ACA TAC/TAL G module 120.

CN 102 (also known as a backbone) is a part of a computer network which interconnects networks, providing a path for the exchange of information between different Local Area Networks (LANs) or subnetworks. In some embodiments, CN 102 ties together diverse networks over wide geographic areas, in different buildings in a campus environment, or in the same building.

In some embodiments, RAN 104 is a global system for mobile communications (GSM) RAN, a GSM/EDGE RAN, a universal mobile telecommunications system (UMTS) RAN (UTRAN), an evolved UMTS terrestrial radio access network (E-UTRAN), open RAN (O-RAN), or cloud-RAN (C-RAN). RAN 104 resides between user equipment 112 (e.g., mobile phone, a computer, or any remotely controlled machine) and CN 102. In some embodiments, RAN 104 is a C-RAN for purposes of simplified representation and discussion. In some embodiments, base band units (BBU) replace the C-RAN.

In conventional distributed cellular networks, equipment at the bottom and top of a base station of a cell site is the BBU. The BBU is radio equipment that links UEs to the CN and processes billions of bits of information per hour. The BBU was traditionally placed in an enclosure or shelter situated at the bottom of a base station. C-RAN, in contrast, uses fiber optic's large signal-carrying capacity to centralize numerous BBUs at a dedicated pool location or a base station. This reduces the quantity of equipment at base stations and provides many other advantages, including lower latency.

In a hierarchical telecommunications network, backhaul portion 106 of ACA TAC/TAL G system 100 comprises the intermediate link(s) between CN 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul generally refers to the side of the network that communicates with the global internet. The connection between base station 108 and UE 112 begins with backhaul 106 connected to CN 102. In some embodiments, backhaul 106 includes wired, fiber optic and wireless components. Wireless sections include using microwave bands, mesh, and edge network topologies that use a high-capacity wireless channels to get packets to the microwave or fiber links.

In some embodiments, base stations 108 are lattice or self-supported towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers (transceivers), digital signal processors, control electronics, a Remote Radio Head (RRH), primary and backup electrical power sources, and sheltering. Base stations are known by other names such as base transceiver station, mobile phone mast, or cell tower. In some embodiments, base stations are replaced or used cooperatively with edge devices configured to wirelessly communicate with UEs. The edge device provides an entry point into service provider CNs, such as CN 102. Examples include routers, routing switches, Integrated Access Devices (IADs), multiplexers, and a variety of Metropolitan Area Network (MAN) and Wide Area Network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc are 60°, 90° or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or Ultra-High Frequency (UHF) (300 MHz to 3 GHz). In other examples, antenna(s) 110 are chosen for their size and directional properties. In some embodiments, the antenna(s) 110 are MIMO (Multiple-Input, Multiple-Output) antenna that send and receive greater than one data signal simultaneously over the same radio channel by exploiting multipath propagation.

In some embodiments, UEs 112 are a computer or computing system. Additionally, or alternatively, UEs 112 have a Liquid Crystal Display (LCD), Light-Emitting Diode (LED) or Organic Light-Emitting Diode (OLED) screen interface providing a touchscreen interface with digital buttons and keyboard or physical buttons along with a physical keyboard. In some embodiments, UE 112 connects to the Internet and interconnects with other devices. Additionally, or alternatively, UE 112 incorporates integrated cameras, the ability to place and receive voice and video telephone calls, video games, and Global Positioning System (GPS) capabilities. Additionally, or alternatively, UEs run Operating Systems (OS) that allow third-party apps specialized for capabilities to be installed and run. In some embodiments, UEs 112 are a computer (such as a tablet computer, netbook, digital media player, digital assistant, graphing calculator, handheld game console, handheld Personal Computer (PC), laptop, Mobile Internet Device (MID), Personal Digital Assistant (PDA), pocket calculator, portable medial player, or ultra-mobile PC), a mobile phone (such as a camera phone, feature phone, smartphone, or phablet), a digital camera (such as a digital camcorder, or Digital Still Camera (DSC), Digital Video Camera (DVC), or front-facing camera), a pager, a Personal Navigation Device (PND), a wearable computer (such as a calculator watch, smartwatch, head-mounted display, earphones, or biometric device), or a smart card.

In at least one embodiment, geographic coverage cells 114 are of any shape and size. In some embodiments, geographic coverage cells 114 are a macro-cell (covering 1 Km-30 Km), a micro-cell (covering 200 m-2 Km), or a pico-cell (covering 4 m-200 m). In some embodiments, geographic coverage cells are circular, oval (FIG. 1), sector, or lobed in shape, but geographic coverage cells 114 are configured in most any shape or size. Geographic coverage cells 114 represent the geographic area antenna 110 and UEs 112 are configured to communicate. Coverage depends on several factors, such as orography (i.e., mountains) and buildings, technology, radio frequency and perhaps most importantly for two-way telecommunications the sensitivity and transmit efficiency of UE 112. Some frequencies provide better regional coverage, while other frequencies penetrate better through obstacles, such as buildings in cities. The ability of a UE to connect to a base station depends on the strength of the signal.

Service provider(s) 116 are businesses, vendors, or organizations that sell bandwidth or network access by providing direct Internet backbone access to Internet service providers and usually access to its Network Access Points (NAPs). Service providers are sometimes referred to as backbone providers, Internet providers, or vendors. Service providers consist of telecommunications companies, data carriers, wireless communications providers, Internet service providers, and cable television operators offering high-speed Internet access.

CM Module 118 manages the resource configurations. One feature of CM module 118 is to provide abstraction over the lower layer devices. Another feature of CM module 118 is configuration tracking. CM module 118 connects to devices on scheduled intervals and pulls the configuration data. CM module 118 further provides user-friendly differentiation to highlight parts of a configuration that have changed. CM module 118 further enforces policies. In FIG. 1, CM module 118 is shown separately from ACA TAC/TAL G module 120, however, in some embodiments, ACA TAC/TAL G module 120 is a submodule of CM module 118 or CM module 118 is a submodule of ACA TAC/TAL G module 120.

In some embodiments, ACA TAC/TAL G module 120 creates TAC/TAL boundaries pursuant to configuration information obtained by CM module 118 daily.

In some embodiments, ACA TAC/TAL G module 120 assigns a TAC for new eNB sites recently added to a network, such as RAN 104.

In some embodiments, ACA TAC/TAL G module 120 audits for anomalies or inaccurate assignments of TACs in a network, such as RAN 104.

In some embodiments, ACA TAC/TAL G module 120 is configured to allow a user to correct discrepancies (e.g., inaccurate assignments of TACs), such as found in an audit.

In some embodiments, ACA TAC/TAL G module 120 performs TAC and TAL planning to determine a size of a TAC boarder and a size of a TAL border. In response to several increasing users in a TAL, paging load increases and ACA TAC/TAL G module 120 further splits the TAL as needed to solve paging overload. In some embodiments, ACA TAC/TAL G module 120 determines an optimum number of eNBs in a TAC, thus balancing the TAU frequency and paging load.

In some embodiments, ACA TAC/TAL G module 120 includes a GUI for a user interface (UI), such as UI 522 (FIG. 5), to visualize TAC boundaries based on the configured TAC for the eNBs in the EMS. This visualization is updated on the daily basis. In some embodiments, the TAC layer network boundaries are visible from a 500 KM zoom level.

In some embodiments, ACA TAC/TAL G module 120 includes a GUI for a user interface (UI), such as UI 522 (FIG. 5), to visualize TAL boundaries based on the configured TAL for the eNBs in the MME. This visualization is updated daily. In some embodiments, the TAL layer network boundaries are visible from a 500 KM zoom level.

In some embodiments, ACA TAC/TAL G module 120 performs a TAC audit accessed in CM module 118. The audit identifies the sites in which the verified TAC is not the same as the planned TAC. A user views the site counts with different (e.g., inaccurate) and planned TAC IDs. The audit further provides the TAC utilization (e.g., assuming the maximum number of sites in each TAC as 80). In some embodiments, on-air and planned sites are considered for the calculation of TAC utilization. In some embodiments, TAC discrepancies are presented for non-radiating sites as well, and these non-radiating sites are decommissioned to be unable to appear in the audit.

In some embodiments, ACA TAC/TAL G module 120 is configured to plan the TAC and TAL for the new sites to a network, such as RAN 104. In some embodiments, the TAC planning feature is available in CM module 118. In some embodiments, a user searches a network visualization site to plan the TAC and TAL. In some embodiments, the user selects a polygon and drags the polygon into the planning window that generates the TAC and TAL for the new polygon.

Figure 2A:
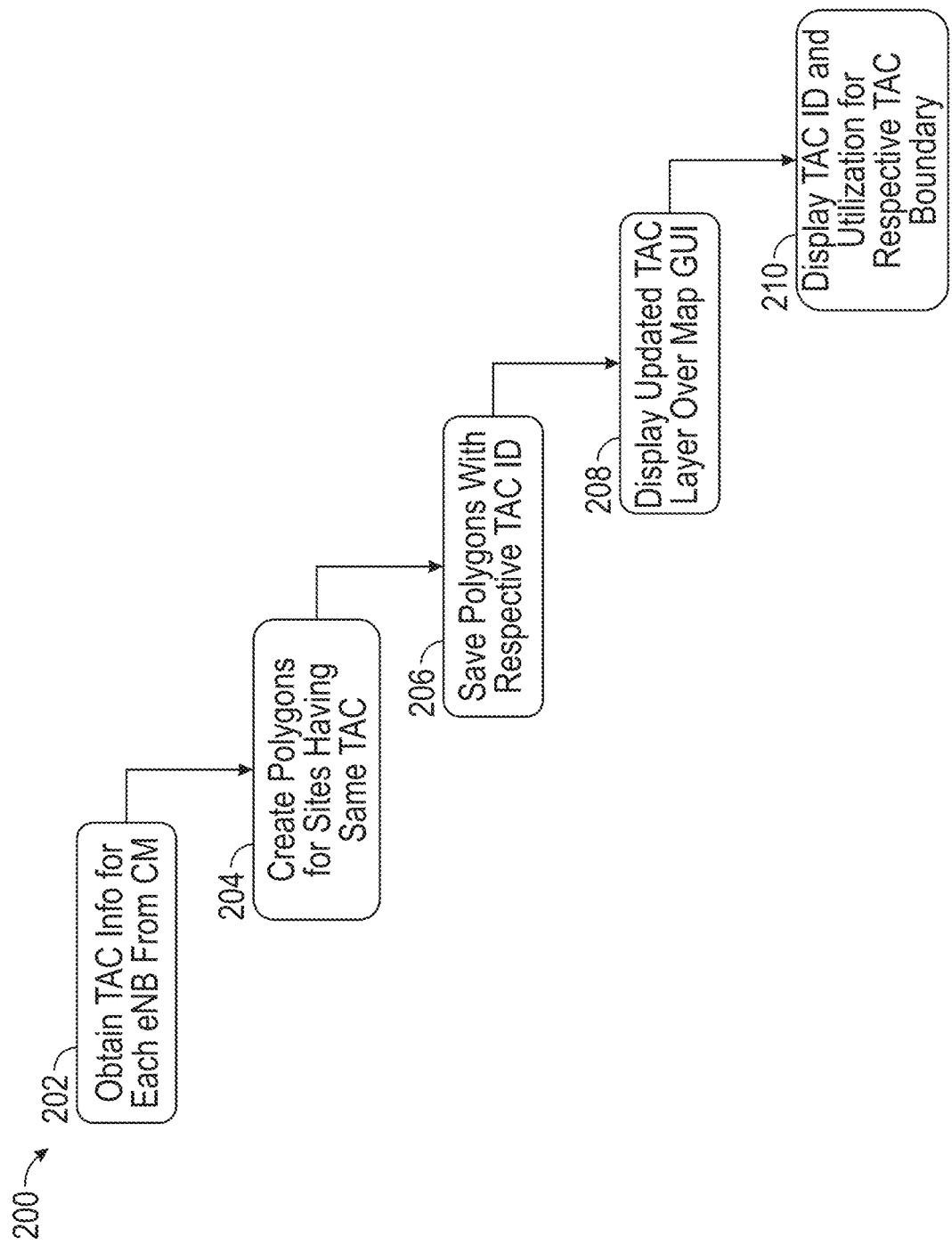
FIG. 2A is a flow diagram representation of a method for tracking area code (TAC) boundary creation, in accordance with some embodiments.

FIG. 2A is a flow diagram representation of a method for tracking area code (TAC) boundary creation 200, in accordance with some embodiments.

Figure 2B:
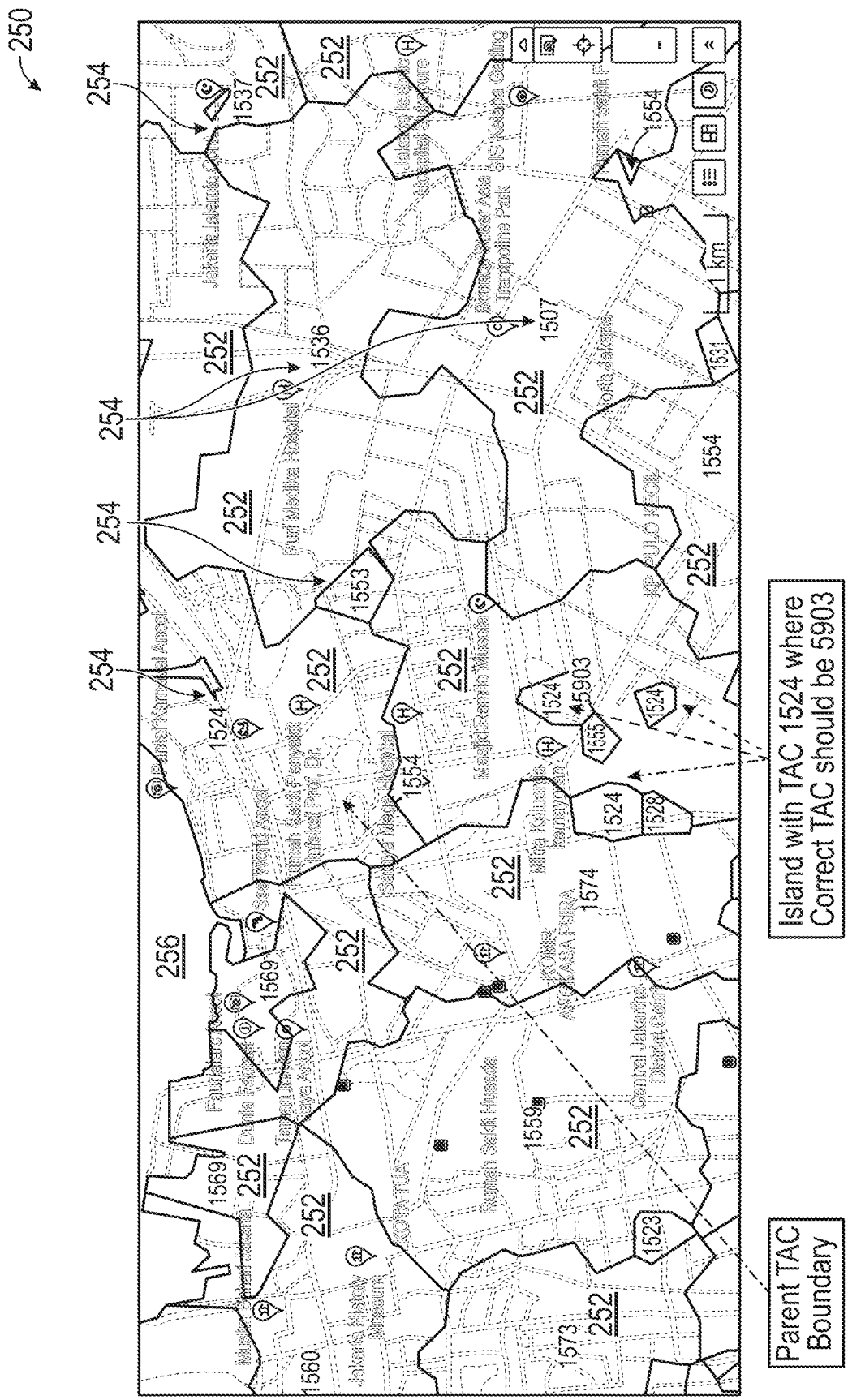
FIG. 2B is a pictorial representation of a graphical user interface (GUI) display of a geographic area layered with TAC boundaries, in accordance with some embodiments.

FIG. 2B is a pictorial representation of a graphical user interface (GUI) display 250 of a geographic area layered with TAC boundaries, in accordance with some embodiments.

For ease of discussion and a better understanding of the embodiments, FIG. 2B is discussed along with FIG. 2A.

While the operations of method 200 are discussed and shown as having a particular order, each operation in method 200 is configured to be performed in any order unless specifically called out otherwise. Method 200 is implemented as a set of operations, such as operations 202 through 210.

In some embodiments, method 200 is configured to automatically create and assign TAC geography (e.g., boundaries). The automatic creation of TAC boundaries according to method 200 is based on data received from the CM, such as CM 118, on daily basis. In some embodiments, data from the CM is received more frequently than a daily basis and, in some embodiments, data from the CM is received less frequently than a daily basis. For purposes of discussion of embodiments of the present discussion data from the CM is received daily as more frequent retrieval of the CM data is unnecessary.

Method 200 describes the assignment of TAC boundaries for new sites (e.g., eNBs) recently added to a network, such as network 104. The automatic creation of TAC boundaries improves the network performance, which results in improved UX. Method 200 is configured to provide visualization of the TAC boundaries based on TACs configured for eNBs in the EMS. The TAC boundary visualization is updated on the daily basis based upon data obtained from the CM. In some embodiments, a TAC layer visualization option is an available selection option for network boundaries and a visualization is realized from a 500 KM zoom level. Method 200 is configured to plan one or more TACs for new eNB sites. In some embodiments, a TAC planning feature is available in the CM. In some embodiments, a user is able to search for a eNB site to plan the TAC, select the eNB by dragging and dropping (a pointing device gesture in which a user selects a virtual object by grabbing the object and dragging the object to a different location or onto another virtual object and is used to invoke actions, or create various types of associations between two abstract objects) the eNB into the planning window (e.g., GUI) and generating the TAC for the eNB.

At operation 202 of method 200, ACA TAC/TAL G module 120 fetches TAC configuration information from CM module 118 for each eNB. The eNB references a group of antennas, such as antennas 110, on a cell tower, such as base stations 108. Each TAC is a group of eNBs in one area. In some embodiments, operation 202 is performed daily. Process flows from operation 202 to operation 204.

At operation 204 of method 200, ACA TAC/TAL G module 120 executes an algorithm for creating polygons 252 (FIG. 2B) for eNBs with the same TAC. In some embodiments, the executed algorithm is a Voronoi algorithm that partitions a plane into regions close to each of a given set of objects. In a non-limiting example, these objects are many points in the plane, where eNBs with the same TAC are grouped together. For each group of points there is a corresponding region, called a Voronoi cell, consisting of all points of the plane closer to that grouping of points than to any other. Continuing the non-limiting example, with a finite set of points {p1, . . . , pn}, where each point is represented as eNBs with the same TAC, in the Euclidean plane. Each eNB pk is simply a point, and its corresponding Voronoi cell Rk consists of every point in the Euclidean plane whose distance to pk is less than or equal to its distance to any other pk. Each such cell is obtained from the intersection of half-spaces, and hence the cell is a (convex) polyhedron (a three-dimensional polygon). The line segments of the Voronoi diagram are all the points in the plane that are equidistant to the two nearest sites. The Voronoi vertices (nodes) are the points equidistant to three (or more) sites. Process flows from operation 204 to operation 206.

Figure 5:
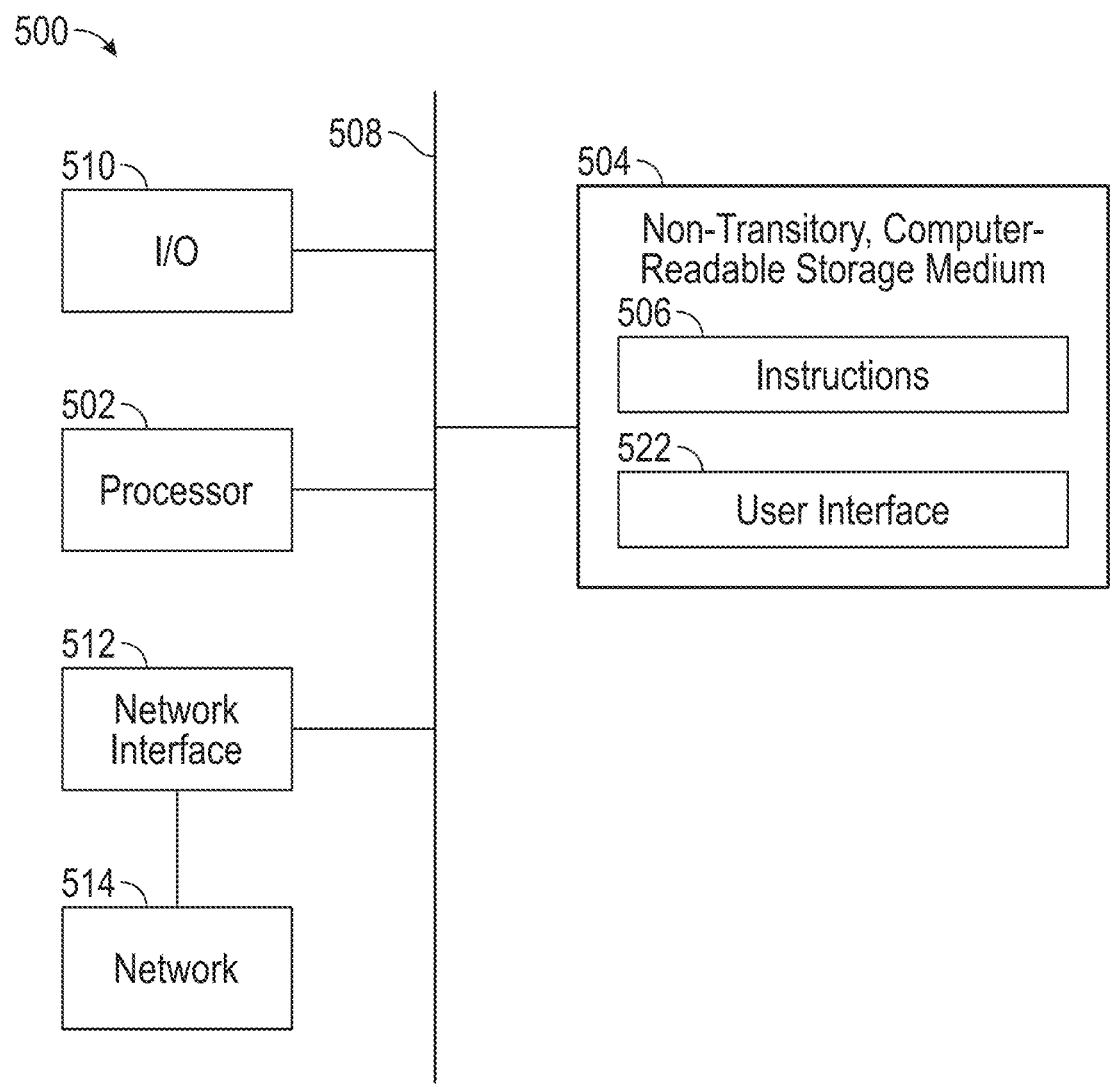
FIG. 5 is a high-level functional block diagram of a processor-based system, in accordance with some embodiments.

At operation 206 of method 200, polygons 252 (FIG. 2B) created in operation 204 are saved/stored in a computer readable storage medium, such as non-transitory computer readable storage medium 504 (FIG. 5). Each polygon 252 is saved with a respective TAC ID 254 (FIG. 2B) for each eNB within the polygon. Process flows from operation 206 to operation 208.

At operation 208 of method 200, GUI 250 displays a map 256 corresponding to a location of interest is overlayed or layered with one or more polygons 252 representing TAC coverage (e.g., polygons 252 created in operation 204). Map 256 with respective polygons 252 are displayed on GUI 250 through a UI on a non-mobile or mobile computing device, such as UE 112. Process flows from operation 208 to operation 210.

At operation 210 of method 200, TAC ID 254 and utilization (e.g., the number of eNBs in a TAC) for the respective TAC boundary is displayed in a pop-up box whenever a mouse icon hovers above a polygon. In some embodiments, TAC utilization provides an engineer or network operator with information regarding whether the TAC is close to the maximum number of eNBs assigned to a TAC.

In computing, a mouseover, mouse hover or hover box is a graphical control element that is activated when the user moves or hovers the pointer over a trigger area, usually with a mouse, but further possible with a digital pen. For example, hovering over a hyperlink triggers the mouseover control element to display a uniform resource locator (URL) on a status bar. Mouseover is also known as rollover, which refers to a button created by a web developer or web designer, found within a web page, used to provide interactivity between the user and the page. The term rollover in this regard originates from the visual process of rolling the mouse cursor over the button causing the button to react (usually visually, by replacing the button's source image with another image), and sometimes resulting in a change in the webpage. The part of the term roll refers to older mice which had a mechanical assembly consisting of a hard rubber ball housed in the base of the mouse (which rolls) contrary to the modern optical mouse, which has no rolling parts. Rollovers are done by imagery, text, or buttons. The user utilizes two images/buttons (with the possible addition of alt text to these images) to perform this interactive action. Rollover imagery is done either by a program with a built-in tool or script coding. The user picks a first image and selects an alternate secondary image. A mouse action will have to be set to either "click on" or "mouse over" for the rollover to be triggered. When the mouseover moves on the image, the alt image/secondary image appears but when the user moves the mouse away from the image, the original source image reappears.

Figure 3A:
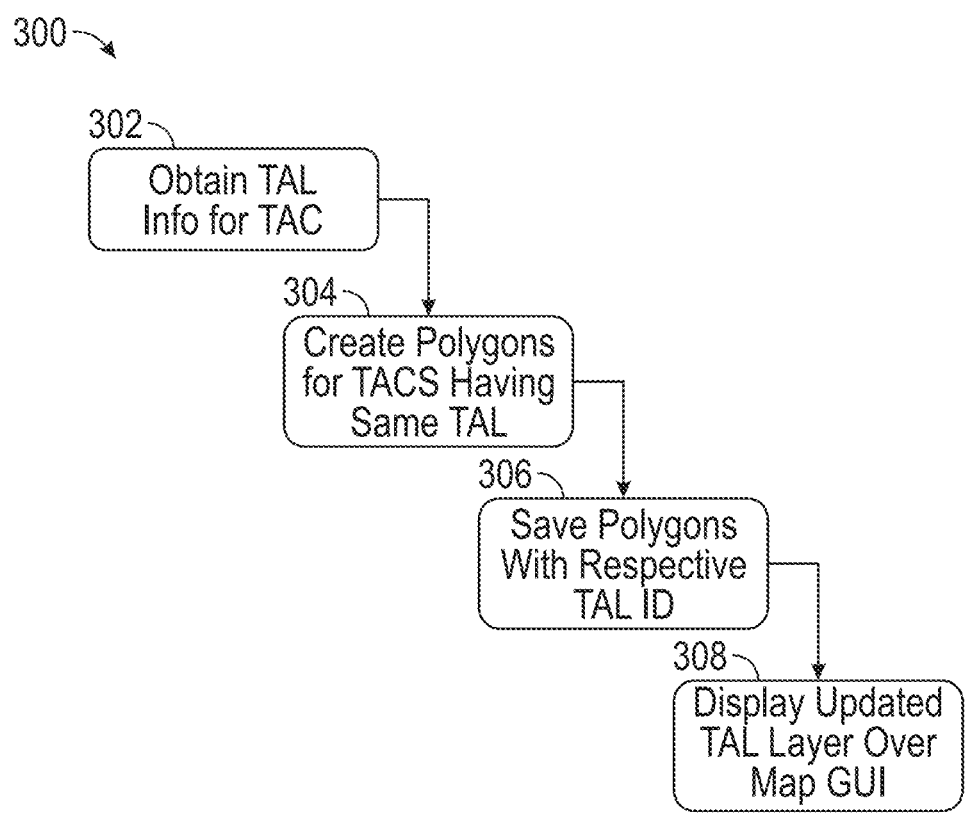
FIG. 3A is a pictorial representation of a method for tracking area list (TAL) boundary creation, in accordance with some embodiments.

FIG. 3A is a flow diagram representation of a method for tracking area list (TAL) boundary creation 300, in accordance with some embodiments.

Figure 3B:
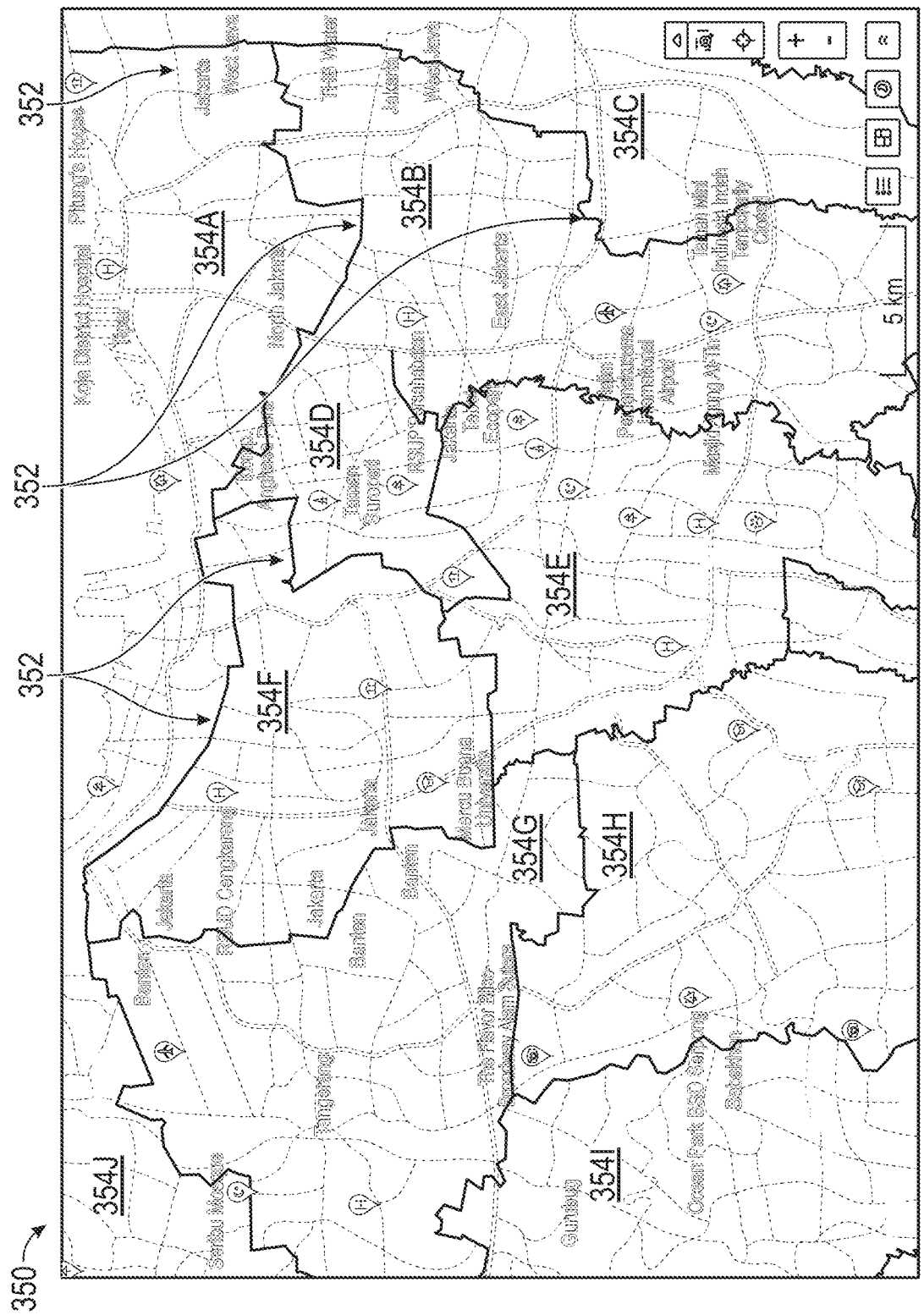
FIG. 3B is a pictorial representation of a GUI display of a geographic area layered with TAL boundaries, in accordance with some embodiments.

FIG. 3B is a pictorial representation of a GUI display 350 of a geographic area layered with TAL boundaries, in accordance with some embodiments.

For ease of discussion and a better understanding of the embodiments, FIG. 3B is discussed along with FIG. 3A.

While the operations of method 300 are discussed and shown as having a particular order, each operation in method 300 is configured to be performed in any order unless specifically called out otherwise. Method 300 is implemented as a set of operations, such as operations 302 through 308.

Method 300 is configured to automatically create and assign TAL geography (e.g., boundaries). The creation of TAL boundaries 352 is based on data received from the CM, such as CM 118, daily, as discussed above. TAL planning is configured to determine the size of a TAL border. The TAL size is the number of TACs included in a TAL.

Method 300 is configured to display TAL boundaries 352 based on configured TAL for the eNBs in the MME. This visualization is updated daily based upon data obtained from the CM. Method 300 is configured to plan TAL boundaries 352 for the new eNBs. A user searches for the eNB to plan the TAL, select the eNB by dragging and dropping the eNB into a planning GUI and generate the TAL for the eNB.

At operation 302 of method 300, ACA TAC/TAL G module 120 obtains TAL configuration information from CM module 118 for each TAC. In some embodiments, operation 302 is performed daily. The TAC references a group of eNBs in a network, such as network 104. Each TAC is a group of eNBs in one area and each TAL is a group of TACs in one area. Process flows from operation 302 to operation 304.

At operation 304 of method 300, ACA TAC/TAL G module 120 executes an algorithm for creating polygons 354A-354J for TACs having the same TAL. As a non-limiting example, polygon 354 contains TAC polygons 252 from FIG. 2B. In some embodiments, the algorithm is like the algorithm of method 200. In some embodiments, the algorithm is a Voronoi algorithm. In a non-limiting example, these objects (e.g., TACs) are many points in the plane, where TACs with the same TAL are grouped together. Continuing the non-limiting example, with a finite set of points {p1, . . . , pn}, where each point represents TACs with the same TAL, in the Euclidean plane. In some embodiments, a centroid for each TAC is used for each point representing a TAC. Each TAC pk is simply a point, and its corresponding Voronoi cell Rk consists of every point in the Euclidean plane whose distance to pk is less than or equal to its distance to any other pk. Each such cell is obtained from the intersection of half-spaces, and hence the cell is a (convex) polyhedron. Process flows from operation 304 to operation 306.

At operation 306 of method 300, the polygons created in operation 304 are saved/stored in a computer readable storage medium, such as non-transitory computer readable storage medium 504 (FIG. 5). Each polygon is saved with a respective TAL ID for each TAC within the polygon. Process flows from operation 306 to operation 308.

At operation 308 of method 300, a GUI displays a map corresponding to a location of interest and is overlayed or layered with one or more polygons representing TAL coverage (e.g., the polygons created in operation 304). The map with respective polygons is displayed on a GUI through a UI on a non-mobile or mobile computing device, such as a UE.

Figure 4:
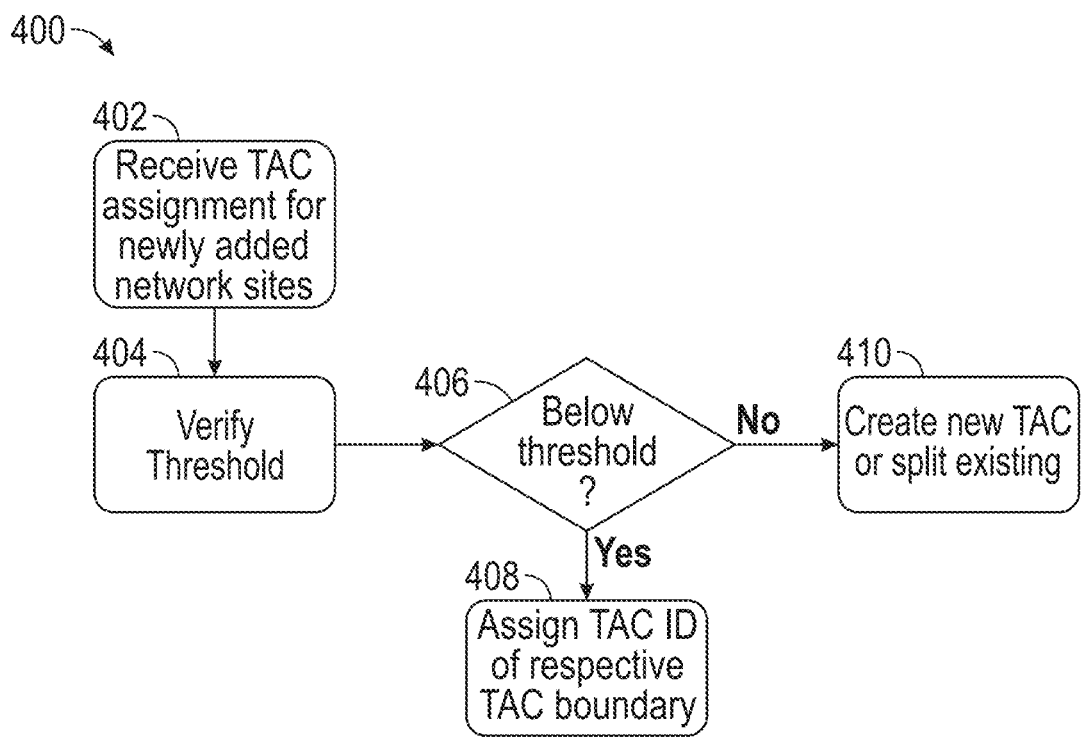
FIG. 4 is a flow diagram representation of a method for TAC assignment for new sites, in accordance with some embodiments.

FIG. 4 is a flow diagram representation of a method for TAC assignment for new sites 400, in accordance with some embodiments.

While the operations of method 400 are discussed and shown as having a particular order, each operation in method 400 is configured to be performed in any order unless specifically called out otherwise. Method 400 is implemented as a set of operations, such as operations 402 through 410.

Method 400 is configured to perform an audit determining incorrect assignment of TAC anomalies in the network, such as network 104. In some embodiments, a user corrects incorrect assignment of TAC anomalies in the network and visualize the improvement the next day. Method 400 is configured to perform a TAC audit. In some embodiments, the TAC audit is accessed in CM 118. Method 400 is configured to identify the eNBs in which the assigned TAC is not the same as a planned TAC. The user views the eNB counts with inaccurately assigned TAC and the planned TAC IDs. Method 400 further provides the TAC utilization assuming the number of eNBs in each TAC has a max upon which a threshold is based. In some embodiments, on-air (e.g., active) and planned (e.g., not currently active) eNBs are considered for determination of TAC utilization. In some embodiments, the TAC discrepancies (e.g., inaccurate TACs) are presented for non-radiating sites as well, where the non-radiating sites are decommissioned so as not to appear in the audit. The RF Planners ensure there is one polygon associated with each TAC. In response to multiple polygons for a TAC, the RF planners (e.g., engineers) change the TAC of the eNBs included in the smaller polygons to a neighboring or encompassing TAC.

At operation 402 of method 400, ACA TAC/TAL G module 120 receives TAC assignment(s) for new eNBs added or to-be-added to the network, such as network 104. In a non-limiting example, one or more of the TAC assignments are inaccurate. Keeping in mind that inaccurate assignment of TAC/TAL leads to TAUs occurring frequently causes increased MME load and UE power consumption increase. In response to TAUs occurring frequently, a UE is unable to respond to a paging message during TAU, reducing the paging success rate. Therefore, assignment of TAC for new sites which are recently being added to network influences TAUs. In some embodiments, the TAC assignments are uploaded by a user. In some embodiments, the TAC assignments are obtained from a storage location discussed in operation 206 of method 200. Process flows from operation 402 to operation 404.

At operation 404 of method 400, an ACA TAC/TAL G algorithm verifies a TAC threshold (e.g., the threshold depends on RAN equipment vendor and is 80% of a TAC eNB maximum). For example, in response to a vendor allowing 200 eNb per TAC, then a threshold of 80% results in a threshold of 160 eNb for that TAC. In a non-limiting example, assuming the maximum number of sites in each TAC is 100, 80% of maximum is 80. Process flows from operation 404 to operation 406.

At operation 406 of method 400, ACA TAC/TAL G module 120 determines whether each TAC's eNB count is below the threshold verified in operation 404. In response to the TAC's eNB count being below the threshold ("YES" branch of block 406), ACA TAC/TAL G module 120 assigns a TAC ID with a neighboring TAC ID or an encompassing TAC ID (a TAC ID of a respective TAC boundary in which the eNB coordinates lie) at operation 408.

With reference to FIG. 2B again, in response to a TAC ID being assigned to each TAC, there is a chance that an island (e.g., TACs 1524, 1528, and 1555) are created due to an incorrect (or different) TAC ID assignment than the TAC the island TAC resides. These islands cause degraded service and/or call drop due to frequent TAUs/handover and registration for a user/subscriber travelling/moving in and around each island. ACA TAC/TAL G module 120 displays the islands (e.g., FIG. 2B) so a network operator/RF planner easily identifies and removes the islands (e.g., TACs 1524, 1528, and 1555) by assigning the islands to a TAC ID (e.g., assigning TACs 1524, 1528, and 1555 to TAC 5903) like a nearby larger or surrounding TAC boundary.

Continuing with the non-limiting example, included in TAC 5903, there are three TAC islands 1524 which is an undesirable implementation of TAC boundaries and impacts the network negatively. Each of TAC islands 1524 are below an eNB count threshold. Therefore, engineers optimize the TAC boundaries anomaly over a GUI by changing the TAC ID of the three islands from 1524 to TAC ID 5903 for the eNBs included in the operations support system (OSS is a software component that enables a service provider to monitor, control, analyze, and manage the services on the network) configuration. Continuing further with the example, in the next twenty-four hours CM module 118 updates the polygon layer and the three islands of TAC 1524 are merged with the correct TAC ID; namely TAC ID 5903.

In response to the TAC's eNB count being above the threshold ("NO" branch of block 406), ACA TAC/TAL G module 120 determines the TAC is overused (e.g., potentially causing frequently occurring TAUs causing increased MME load and UE power consumption increase). In response to the TAC being overused (exceeding the threshold), method 400 creates a new TAC, such as splitting the existing TAC into a new TAC and existing TAC at operation 410.

Continuing with the non-limiting example above, in the event merging the three TAC ID islands from 1524 to TAC ID 5903 exceeds the threshold for TAC ID 5903, then at operation 410 the existing TAC ID 5903 is split into two or more new TAC IDs (or a new TAC ID along with the existing TAC ID). Referencing FIG. 2B yet again for another non-limiting example, the island (in the lower left corner of map 256) with TAC ID 1523 is merged with TAC ID 1573 or TAC ID 1559. In some embodiments, the merging of TAC island ID 1523 with TAC boundaries 1573 or 1559 is based upon which TAC boundary, when merged with TAC island ID 1523, includes less than the threshold eNB count (e.g., 80% of eNB maximum sites).

FIG. 5 is a block diagram of an auto creation and assignment of TAC/TAL geography (ACA TAC/TAL G) processing circuitry 500 in accordance with some embodiments. In some embodiments, ACA TAC/TAL G processing circuitry 500 is a general-purpose computing device including a hardware processor 502 and a non-transitory, computer-readable storage medium 504. Storage medium 504, amongst other things, is encoded with, i.e., stores, computer program code 506, i.e., a set of executable instructions such as ACA TAC/TAL G algorithm and methods 200, 300, and 400. Execution of instructions 506 by hardware processor 502 represents (at least in part) a network visualization application which implements a portion, or all the methods described herein in accordance with one or more embodiments (hereinafter, the noted processes and/or methods).

Processor 502 is electrically coupled to a computer-readable storage medium 504 via a bus 508. Processor 502 is electrically coupled to an I/O interface 510 by bus 508. A network interface 512 is also electrically connected to processor 502 via bus 508. Network interface 512 is connected to a network 514, so that processor 502 and computer-readable storage medium 504 connect to external elements via network 514. Processor 502 is configured to execute computer program code 506 encoded in computer-readable storage medium 504 to cause ACA TAC/TAL G processing circuitry 500 to be usable for performing a portion or all the noted processes and/or methods. In one or more embodiments, processor 502 is a Central Processing Unit (CPU), a multi-processor, a distributed processing system, an Application Specific Integrated Circuit (ASIC), and/or a suitable processing unit.

In one or more embodiments, computer-readable storage medium 504 is an electronic, magnetic, optical, electromagnetic, infrared, and/or a semiconductor system (or apparatus or device). For example, computer-readable storage medium 504 includes a semiconductor or solid-state memory, a magnetic tape, a removable computer diskette, a Random Access Memory (RAM), a Read-Only Memory (ROM), a rigid magnetic disk, and/or an optical disk. In one or more embodiments using optical disks, computer-readable storage medium 504 includes a Compact Disk-Read Only Memory (CD-ROM), a Compact Disk-Read/Write (CD-R/W), and/or a Digital Video Disc (DVD).

In one or more embodiments, storage medium 504 stores computer program code 506 configured to cause ACA TAC/TAL G processing circuitry 500 to be usable for performing a portion or all the noted processes and/or methods. In one or more embodiments, storage medium 504 also stores information, such as ACA TAC/TAL G algorithm which facilitates performing a portion or all the noted processes and/or methods.

ACA TAC/TAL G processing circuitry 500 includes I/O interface 510. I/O interface 510 is coupled to external circuitry. In one or more embodiments, I/O interface 510 includes a keyboard, keypad, mouse, trackball, trackpad, touchscreen, and/or cursor direction keys for communicating information and commands to processor 502.

ACA TAC/TAL G processing circuitry 500 also includes network interface 512 coupled to processor 502. Network interface 512 allows ACA TAC/TAL G processing circuitry 500 to communicate with network 514, to which one or more other computer systems are connected. Network interface 512 includes wireless network interfaces such as BLUETOOTH, WIFI, WIMAX, GPRS, or WCDMA; or wired network interfaces such as ETHERNET, USB, or IEEE-864. In one or more embodiments, a portion or all noted processes and/or methods, is implemented in two or more ACA TAC/TAL G processing circuitry 500.

ACA TAC/TAL G processing circuitry 500 is configured to receive information through I/O interface 510. The information received through I/O interface 510 includes one or more of instructions, data, design rules, libraries of standard cells, and/or other parameters for processing by processor 502. The information is transferred to processor 502 via bus 508. ACA TAC/TAL G processing circuitry 500 is configured to receive information related to a UI through I/O interface 510. The information is stored in computer-readable medium 504 as User Interface (UI) 522.

In some embodiments, a method of auditing tracking area code (TAC) assignments includes obtaining one or more tracking area code (TAC) assignments for one or more new evolved Node B (eNB) sites added to a RAN network in a geographic area; verifying a TAC threshold, where the TAC threshold corresponds with a predetermined number of eNBs per TAC; in response a TAC being below the TAC threshold, assigning a TAC ID of a corresponding neighboring TAC to the TAC; and in response to the TAC being above the TAC threshold, splitting the TAC into two or more TACs.

In some embodiments, the method further includes, prior to obtaining the one or more tracking area code (TAC) assignments for the one or more new eNB sites added to the RAN network in the geographic area, obtaining tracking area code (TAC) assignments from each eNB in the geographic area.

In some embodiments, the method further includes creating a first set of shapes to be layered over the geographic area and each shape corresponding to eNB sites having a same TAC.

In some embodiments, the method further includes storing the created first set of shapes in a computer readable medium where each TAC is assigned a TAC ID.

In some embodiments, the method further includes causing a graphical user interface (GUI) to be output by a user interface (UI), the GUI includes a display of one or more of the first set of shapes having a visual boundary, corresponding to the geographic area, layered over a map of the geographic area; and in response to a mouseover over a shape having a visual boundary, a display of a pop-up window that displays a TAC ID and utilization for the mouse-overed shape.

In some embodiments, the method further includes obtaining tracking area lists (TALs) from each TAC in the geographic area.

In some embodiments, the method further includes creating a second set of shapes to be layered over the geographic area and each shape corresponding to TACs having a same TAL.

In some embodiments, the method further includes storing the created second set of shapes in the non-transitory computer readable medium where each TAL is assigned a TAL ID.

In some embodiments, the method further includes updating the GUI to be output by the UI, the GUI includes a display of one or more of the second set of shapes having a visual boundary, corresponding to the geographic area, layered over a representation of the geographic area.

In some embodiments, an apparatus for auditing tracking area codes (TACs) includes a processor; and a memory having instructions stored thereon that, when executed by the processor, cause the apparatus to obtain one or more tracking area code (TAC) assignments for one or more new evolved Node B (eNB) sites added to a RAN network in a geographic area; verify a TAC threshold, where the TAC threshold corresponds with a predetermined number of eNBs per TAC; in response a TAC being below the TAC threshold, assign a TAC ID of a corresponding neighboring TAC to the TAC; and in response to the TAC being above the TAC threshold, split the TAC into two or more TACs.

In some embodiments, the instructions further cause the processor to prior to obtaining the one or more tracking area code (TAC) assignments for the one or more new eNB sites added to the RAN network in the geographic area, obtain tracking area code (TAC) assignments from each eNB in the geographic area.

In some embodiments, the instructions further cause the processor to create a first set of shapes to be layered over the geographic area and each shape corresponding to eNB sites having a same TAC.

In some embodiments, the instructions further cause the processor to store the created first set of shapes in a computer readable medium where each TAC is assigned a TAC ID.

In some embodiments, the instructions further cause the processor to cause a graphical user interface (GUI) to be output by a user interface (UI), the GUI includes a display of one or more of the first set of shapes having a visual boundary, corresponding to the geographic area, layered over a map of the geographic area; and in response to a mouseover over a shape having a visual boundary, a display of a pop-up window that displays a TAC ID and utilization for the mouse-overed shape.

In some embodiments, the instructions further cause the processor to obtain tracking area lists (TALs) from each TAC in the geographic area.

In some embodiments, a non-transitory computer readable medium having instructions stored thereon that, when executed by a processor, cause an apparatus to obtain one or more tracking area code (TAC) assignments for one or more new evolved Node B (eNB) sites added to a RAN network in a geographic area; verify a TAC threshold, where the TAC threshold corresponds with a predetermined number of eNBs per TAC; in response a TAC being below the TAC threshold, assign a TAC ID of a corresponding neighboring TAC to the TAC; and in response to the TAC being above the TAC threshold, split the TAC into two or more TACs.

In some embodiments, the instructions further cause the processor to prior to obtaining the one or more tracking area code (TAC) assignments for the one or more new eNB sites added to the RAN network in the geographic area, obtain TAC assignments from each eNB in the geographic area; create a first set of shapes to be layered over the geographic area and each shape corresponding to eNB sites having a same TAC; store the created first set of shapes in a computer readable medium where each TAC includes a corresponding TAC ID; cause a graphical user interface (GUI) to be output by a user interface (UI), the GUI includes a display of one or more of the first set of shapes having a visual boundary, corresponding to the geographic area, layered over a map of the geographic area; and in response to a mouseover over a shape having a visual boundary, a display of a pop-up window that displays a corresponding TAC ID and utilization for the mouse-overed shape.

In some embodiments, the instructions further cause the processor to obtain tracking area lists (TALs) from each TAC in the geographic area.

In some embodiments, the instructions further cause the processor to prior to obtaining the one or more tracking area codes (TACs) for the one or more new eNB sites added to the RAN network in the geographic area, obtain TALs from each TAC in the geographic area; create a first set of shapes to be layered over a representation of the geographic area where each shape corresponds to TACs having a same TAL; store the created first set of shapes where each TAL is assigned a TAL ID; and cause a graphic user interface (GUI) to be output by a user interface (UI), the GUI includes a display of one or more of the first set of shapes having a visual boundary, corresponding to the geographic area, layered over the representation of the geographic area.

In some embodiments, the instructions further cause the processor to obtain TACs from each eNB in the geographic area.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A method of auditing tracking area code (TAC) assignments, the method comprising:
   obtaining one or more tracking area code (TAC) assignments for one or more new evolved Node B (eNB) sites added to a RAN network in a geographic area;
   verifying a TAC threshold, where the TAC threshold corresponds with a predetermined number of eNBs per TAC;
   in response a TAC being below the TAC threshold, assigning a TAC ID of a corresponding neighboring TAC to the TAC; and
   in response to the TAC being above the TAC threshold, splitting the TAC into two or more TACs.

2. The method of auditing tracking area code (TAC) assignments claim 1, further comprising:
   prior to obtaining the one or more tracking area code (TAC) assignments for the one or more new eNB sites added to the RAN network in the geographic area, obtaining tracking area code (TAC) assignments from each eNB in the geographic area.

3. The method of auditing tracking area code (TAC) assignments claim 2, further comprising:
   creating a first set of shapes to be layered over the geographic area and each shape corresponding to eNB sites having a same TAC.

4. The method of auditing tracking area code (TAC) assignments claim 3, further comprising:
   storing the created first set of shapes in a computer readable medium where each TAC is assigned a TAC ID.

5. The method of auditing tracking area code (TAC) assignments claim 4, further comprising:
   causing a graphical user interface (GUI) to be output by a user interface (UI), the GUI comprising:
      a display of one or more of the first set of shapes having a visual boundary, corresponding to the geographic area, layered over a map of the geographic area; and
      in response to a mouseover over a shape having a visual boundary, a display of a pop-up window that displays a TAC ID and utilization for the mouse-overed shape.

6. The method of auditing tracking area code (TAC) assignments of claim 5, further comprising:
   obtaining tracking area lists (TALs) from each TAC in the geographic area.

7. The method of auditing tracking area code (TAC) assignments of claim 6, further comprising:
   creating a second set of shapes to be layered over the geographic area and each shape corresponding to TACs having a same TAL.

8. The method of auditing tracking area code (TAC) assignments of claim 7, further comprising:
   storing the created second set of shapes in the non-transitory computer readable medium where each TAL is assigned a TAL ID.

9. The method of auditing tracking area code (TAC) assignments of claim 8, further comprising:
   updating the GUI to be output by the UI, the GUI comprising:
      a display of one or more of the second set of shapes having a visual boundary, corresponding to the geographic area, layered over a representation of the geographic area.

10. An apparatus for auditing tracking area codes (TACs), the apparatus comprising:
   a processor; and
   a memory having instructions stored thereon that, when executed by the processor, cause the apparatus to:
      obtain one or more tracking area code (TAC) assignments for one or more new evolved Node B (eNB) sites added to a RAN network in a geographic area;
      verify a TAC threshold, where the TAC threshold corresponds with a predetermined number of eNBs per TAC;
      in response a TAC being below the TAC threshold, assign a TAC ID of a corresponding neighboring TAC to the TAC; and
      in response to the TAC being above the TAC threshold, split the TAC into two or more TACs.

11. The apparatus of claim 10, wherein the instructions further cause the processor to:
   prior to obtaining the one or more tracking area code (TAC) assignments for the one or more new eNB sites added to the RAN network in the geographic area, obtain tracking area code (TAC) assignments from each eNB in the geographic area.

12. The apparatus of claim 11, wherein the instructions further cause the processor to:
   create a first set of shapes to be layered over the geographic area and each shape corresponding to eNB sites having a same TAC.

13. The apparatus of claim 12, wherein the instructions further cause the processor to:
   store the created first set of shapes in a computer readable medium where each TAC is assigned a TAC ID.

14. The apparatus of claim 13, wherein the instructions further cause the processor to:
   cause a graphical user interface (GUI) to be output by a user interface (UI), the GUI comprising:
      a display of one or more of the first set of shapes having a visual boundary, corresponding to the geographic area, layered over a map of the geographic area; and
      in response to a mouseover over a shape having a visual boundary, a display of a pop-up window that displays a TAC ID and utilization for the mouse-overed shape.

15. The apparatus of network boundary creation of claim 14, wherein the instructions further cause the processor to:
   obtain tracking area lists (TALs) from each TAC in the geographic area.

16. A non-transitory computer readable medium having instructions stored thereon that, when executed by a processor, cause an apparatus to:
   obtain one or more tracking area code (TAC) assignments for one or more new evolved Node B (eNB) sites added to a RAN network in a geographic area;
   verify a TAC threshold, where the TAC threshold corresponds with a predetermined number of eNBs per TAC;
   in response a TAC being below the TAC threshold, assign a TAC ID of a corresponding neighboring TAC to the TAC; and
   in response to the TAC being above the TAC threshold, split the TAC into two or more TACs.

17. The non-transitory computer readable medium of claim 16, wherein the instructions further cause the processor to:

prior to obtaining the one or more tracking area code (TAC) assignments for the one or more new eNB sites added to the RAN network in the geographic area, obtain TAC assignments from each eNB in the geographic area;

create a first set of shapes to be layered over the geographic area and each shape corresponding to eNB sites having a same TAC;

store the created first set of shapes in a computer readable medium where each TAC includes a corresponding TAC ID;

cause a graphical user interface (GUI) to be output by a user interface (UI), the GUI comprising:
a display of one or more of the first set of shapes having a visual boundary, corresponding to the geographic area, layered over a map of the geographic area; and
in response to a mouseover over a shape having a visual boundary, a display of a pop-up window that displays a corresponding TAC ID and utilization for the mouseovered shape.

18. The non-transitory computer readable medium of claim 17, wherein the instructions further cause the processor to:
obtain tracking area lists (TALs) from each TAC in the geographic area.

19. The non-transitory computer readable medium of claim 16, wherein the instructions further cause the processor to:
prior to obtaining the one or more tracking area codes (TACs) for the one or more new eNB sites added to the RAN network in the geographic area, obtain TALs from each TAC in the geographic area;

create a first set of shapes to be layered over a representation of the geographic area where each shape corresponds to TACs having a same TAL;

store the created first set of shapes where each TAL is assigned a TAL ID; and cause a graphic user interface (GUI) to be output by a user interface (UI), the GUI comprising:
a display of one or more of the first set of shapes having a visual boundary, corresponding to the geographic area, layered over the representation of the geographic area.

20. The non-transitory computer readable medium of claim 19, wherein the instructions further cause the processor to:
obtain TACs from each eNB in the geographic area.

* * * * *